J. L. HILLER.
BEARING.
APPLICATION FILED SEPT. 25, 1915.
1,207,041.
Patented Dec. 5, 1916.
3 SHEETS—SHEET 1.
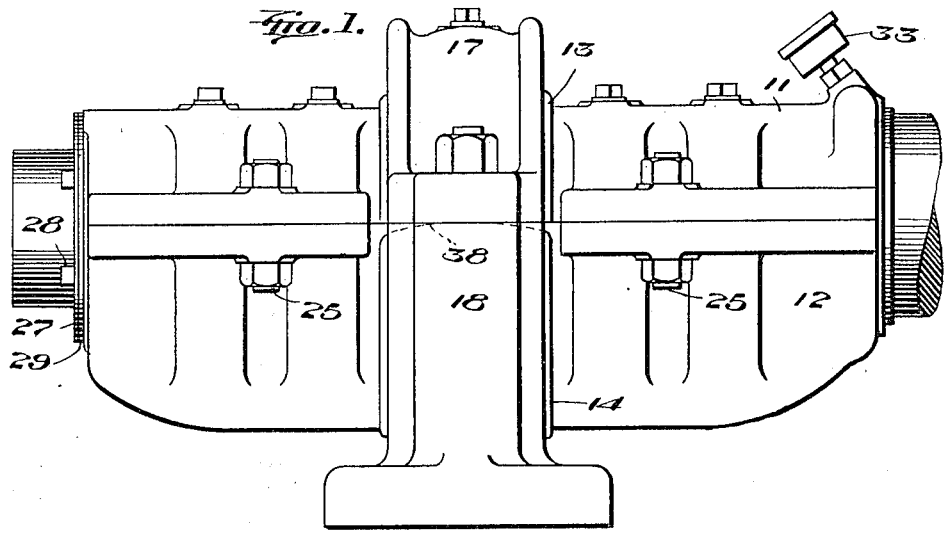
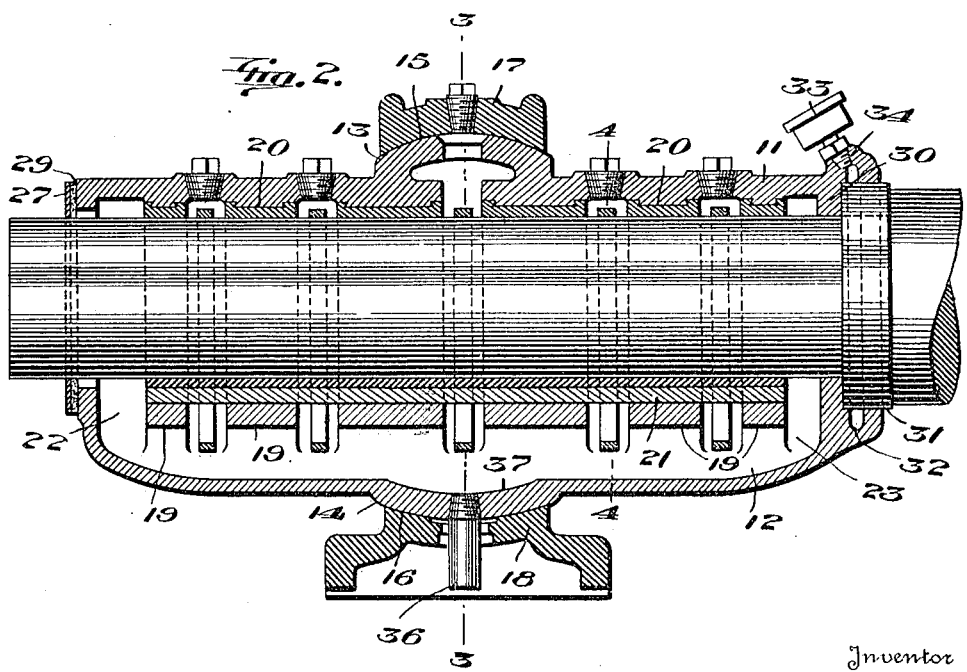
Witnesses
Philip E. Barnes
J. J. Mawhinney
Inventor
Joseph L. Hiller
By Meyer Cushman & Rea
Attorney J. L. HILLER.
BEARING.
APPLICATION FILED SEPT. 25, 1915.
1,207,041.
Patented Dec. 5, 1916.
3 SHEETS—SHEET 2.
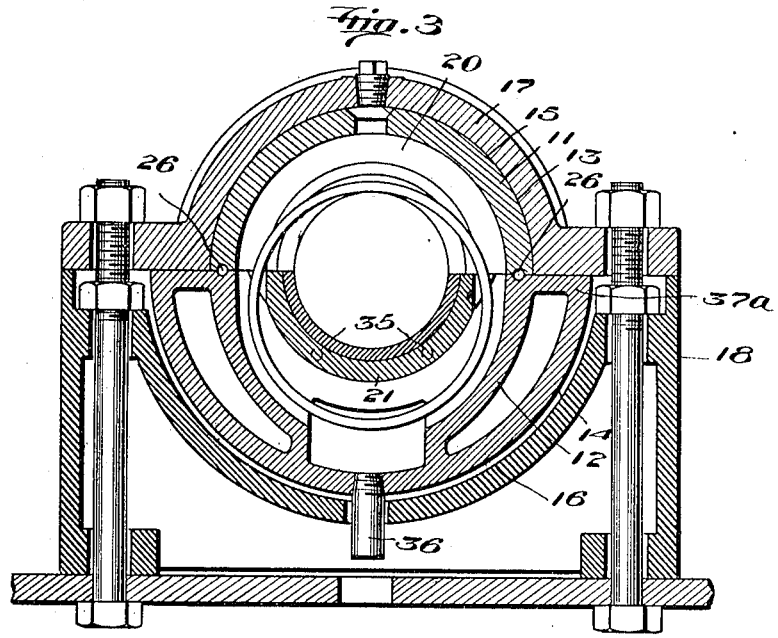
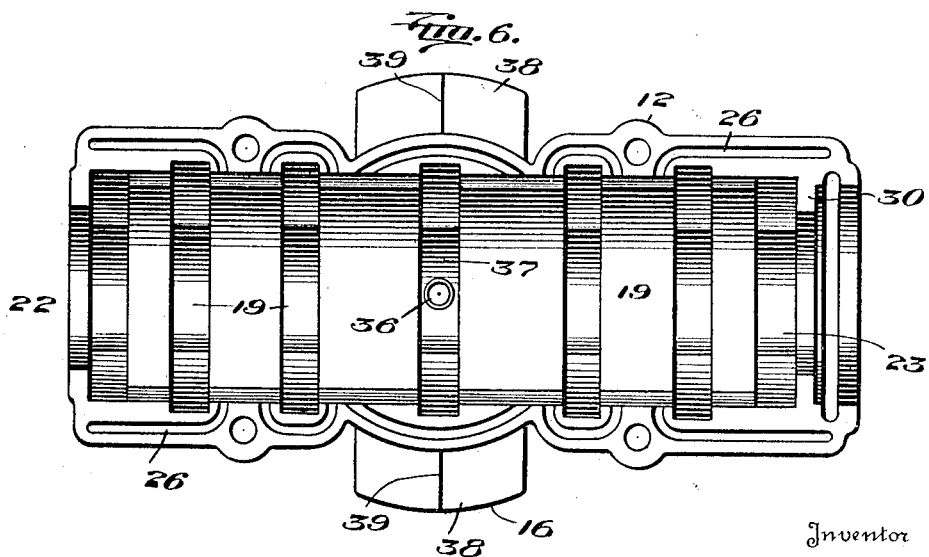
Witnesses
Philip E. Barnes
T. J. Mawhinney
Inventor
Joseph L. Hiller
By Meyers Cushman Rea
Attorney

J. L. HILLER.
BEARING.
APPLICATION FILED SEPT. 25, 1915.

1,207,041.

Patented Dec. 5, 1916.
3 SHEETS—SHEET 3.

Witnesses
Philip E. Barnes
J. J. Mawhinney

Inventor
Joseph L. Hiller
By Myers Cushman & Rea
Attorney

UNITED STATES PATENT OFFICE.

JOSEPH L. HILLER, OF MATTAPOISETT, MASSACHUSETTS.

BEARING.

1,207,041.          Specification of Letters Patent.          Patented Dec. 5, 1916.

Original application filed January 25, 1911, Serial No. 604,621. Divided and this application filed September 25, 1915. Serial No. 52,664.

*To all whom it may concern:*

Be it known that I, JOSEPH L. HILLER, a citizen of the United States, residing at Mattapoisett, in the county of Plymouth and State of Massachusetts, have invented new and useful Improvements in Bearings, of which the following is a specification.

This invention relates to improvements in bearings, is a division of application, Serial No. 604,621, filed January 25, 1911, and has particular reference to the interal construction of the bearing.

It is an object of this invention to provide a bearing which is capable of doing heavy work at high speed; for use under unfavorable working conditions where careless attendance prevails; which is provided with a continuous liner extending from end to end of the bearing to present a relatively large supporting surface for the shaft; to provide a support for the liner throughout substantially its entire length; which has an oil reservoir or chamber extending continuously throughout the length of the bearing; and which is provided with means for sealing the bearing to exclude the entrance of dirt and to thus prolong the life of the parts of the bearing and the journal or shaft supported therein.

Other objects and advantages of this invention will be brought out more in detail in the following disclosure of one specific embodiment of the invention, the same being disclosed in the accompanying drawings wherein—

Figure 4:
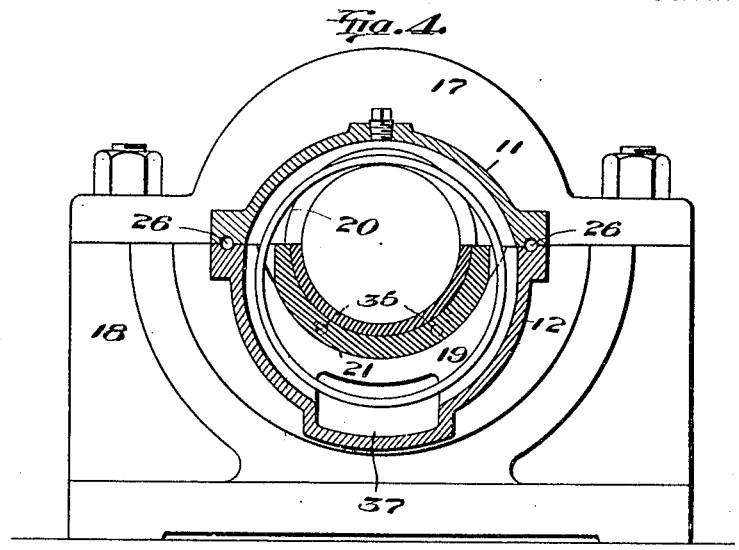
Figure 5:
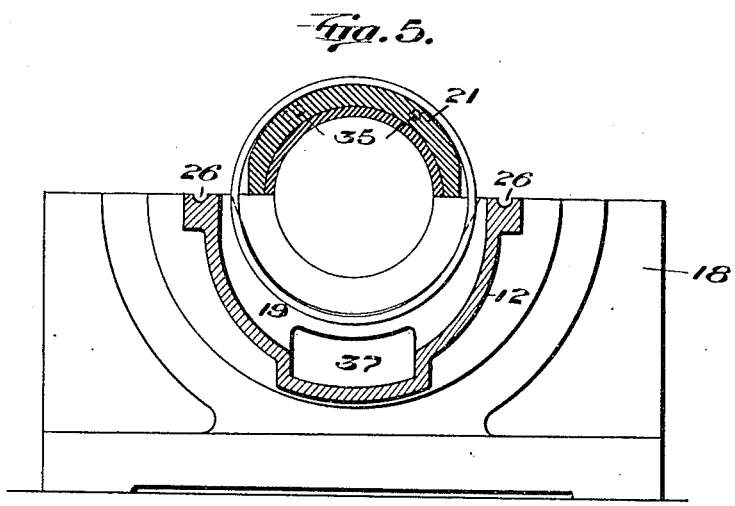

Figure 1 is a side elevation of the bearing and its support. Fig. 2 is a longitudinal vertical section of the same showing a shaft in place in the bearing. Fig. 3 is a transverse section of the bearing taken centrally on the line 3—3 of Fig. 2. Fig. 4 is a transverse section taken on the line 4—4 of Fig. 2. Fig. 5 is a transverse section on the line 4—4 of Fig. 2 showing the liner in position to be removed, and Fig. 6 is a top plan view of the lower portion of the bearing.

The body of the bearing comprises the two main sections or halves 11 and 12 which are supported in any convenient manner, as, for instance, between the support or pillow block 18 and the bearing cap 17. The body of the bearing is of considerably greater length than the width of the support and cap. In the present disclosure, the sections 11 and 12 of the body of the bearing are provided with ball or spherical surfaces 13 and 14 about their middle, adapted to bear on corresponding surfaces 15 and 16 provided respectively in the bearing cap 17 and the pillow block 18. By this construction, the body of the bearing has universal support. The section 12 of the bearing is provided with transverse ribs 19 while the section 11 is provided with registering transverse ribs 20 which are cast integral with the members 11 and 12, respectively. The ribs 20 of the upper half of the bearing are babbitted for contact with the shaft, while the lower ribs 19 are machined for supporting a liner 21 thereon which engages beneath the shaft. The liner 21 is suitably babbitted for providing a bearing surface for the shaft. The liner 21 extends substantially throughout the entire length of the bearing, the same terminating but a short distance from the extremities of the bearing to provide spaces 22 and 23 which extend down into the bottom of the bearing and are adapted to receive solid oil rings during the positioning or removal of the liner as hereinafter pointed out. It will be noted that the ribs 19 are secured at their ends to the sides of the lower section 12 and that they provide therebeneath an uninterrupted oil reservoir or chamber extending in a straight line from end to end of the bearing and opening at its ends respectively into the spaces 22 and 23. The oil rings are of sufficient diameter to dip into the middle of the reservoir and carry the oil up over the shaft.

The two sections or halves 11 and 12 of the bearing are secured together by bolts 25 and are provided within their abutting edges or faces with oil grooves 26 extending longitudinally of the bearing and opening through the inner wall thereof. The oil grooves are adapted to catch and return oil seeping through the crevices between the adjoining edges of the upper and lower sections of the bearing.

The opposite ends of the bearing are sealed or closed to prevent access of dirt to the interior of the bearing and to prevent leakage of oil from the bearing. The outer end of the bearing is closed by a plate 27 secured to the end of the body by screws 28 and holding a packing ring 29 against the end of the bearing to form a tight joint. The opposite or inner end of the bearing is provided with an internal flange 30 formed well within the end of the bearing and having its outer face finished to form a square shoulder to receive thereagainst a collar 31 on the shaft, the projecting end of the bearing being bored to make a reasonably close fit with the circular periphery of the collar 31 and provided about the collar with a groove 32 to which grease is supplied from a grease cup 33 opening into channel 34 to form a seat. The inner end of the bearing also provides for a thrust bearing, the grease between the contacting surfaces of the shoulder 30 and the collar 31 not only lubricating these parts but also providing an effective seal against the entry of any foreign matter whatsoever into the bearing.

It will be noted that when it is desired to inspect the bearing the top half 11 may be readily removed by simply removing the top cap 17 of the support. The liner 21 may be removed without disturbing the lower half of the bearing, or without removing the shaft by applying a spanner-wrench to the holes 35 in the ends of the liner, and rotating the liner until it assumes the position shown in Fig. 5 at the top of the bearing. When the liner is in this position, the rings by virtue of the chamfered edges of the liner and the lower half of the bearing may be easily raised and moved longitudinally of the shaft to the end spaces 22 and 23 of the bearing and out of contact with the liner. The liner may now be lifted from the shaft.

As shown in Fig. 2 of the drawings, the oil reservoir or chamber extends the full length of the bearing and is open throughout its length being unobstructed by any ribs or other projections. The bottom of the reservoir tapers downwardly toward the middle of the bearing where it is lowest, and a drainage passageway 36 is provided which extends from a central depression 37 down through the support 18. An opening in the support 18 is made for this passageway and the latter is normally closed in any suitable manner. A free and unobstructed circulation of a large body of oil is thus assured in the bearing.

The lower half 12 of the bearing is of larger radius than the upper half 11, and as the liner is one piece and extends throughout the entire length of the bearing, the liner is held from rotation from its bottommost position by engagement of its upper edges with the lower edges of the ribs 20 of the upper section 11 of the bearing. It will also be noted that the body of the bearing as a whole is held from rotation in the socket formed by the support 18 and cap 17, by the engagement of the edges 37ª of the lower half 12 of the bearing projecting laterally beyond the edges of the upper half 11 and into engagement with the lower faces of the cap 17. It will be noted that the top surface 38 of the section 12 of the bearing is sloped in opposite directions from a central line as at 39, so that there will be but a single line of contact between the lower section of the bearing and the cap 17 of the support, and there is thus no interference when oscillation of the bearing takes place in a vertical plane.

I claim:

1. A bearing comprising a journal box, a plurality of transverse supports in the lower part of said journal box spaced apart throughout substantially the entire length of the same, a continuous liner adapted to be supported by said supports, and a continuous unbroken oil well extending from end to end of the bearing and located beneath said liner and supports.

2. A bearing comprising a body portion having a plurality of spaced-apart supports in the lower part thereof, and provided with a continuous unbroken oil-well beneath said supports extending from end to end of the bearing, and means for draining the oil from said well.

3. A bearing comprising an upper part, a relatively larger lower part, and a liner carried in the lower part and adapted for engagement with the upper part to retain the liner from rotation, said liner being rotatable through substantially 180 degrees upon the removal of the upper part whereby said liner may be removed from the bearing without disturbing the relation between the shaft and the lower part.

4. A bearing comprising an upper part, a relatively large lower part, and a continuous liner extending from end to end in the lower part and being of semi-circular cross-section, said upper part being adapted to engage the edges of the liner whereby to hold the same from rotation in the lower part, said liner being rotatable through substantially 180 degrees upon the removal of the upper part whereby to admit of the removal of the liner without disturbing the relation between the shaft and the lower part of the bearing.

5. A bearing comprising an upper part, a relatively large lower part, and an unbroken liner supported within the lower part and extending from end to end thereof and adapted for rotation to a position above the shaft, said upper part being adapted to engage said liner whereby to hold the same from rotation when in position in the lower part, said upper part being without a liner and having a bearing surface engaging directly with the shaft, said liner being rotatable above the shaft upon the removal of the upper part.

6. A bearing comprising upper and lower parts, and having oil grooves extending longitudinally in the abutting edge of one of the parts and opening to the interior of the bearing whereby to return oil seeping through the crevice between the parts to the bearing.

7. A bearing comprising upper and lower parts, an unbroken liner extending from end to end in the lower part, said lower part having an uninterrupted oil-well extending in a straight line from end to end in the bottom thereof, and having oil grooves in its abutting edges opening to the interior of the bearing adapted to return oil seeping through the parts of the bearing to the oil chamber.

8. In a bearing, a body portion having an oil-well therein and bearing surfaces for supporting a shaft, a flange at the end of the bearing, a flange carried by the shaft and abutting said first-mentioned flange, and a grease seal in the end of the bearing about said second-mentioned flange adapted to lubricate the abutting faces of said flanges and seal the crevice therebetween.

9. A bearing comprising a body portion having an oil-well therein and shaft supporting surfaces, an internal flange at the end of the bearing, a flange about the shaft adapted to abut said internal flange, said end of the bearing having an internal groove about said flange on the shaft, and means for supplying a grease to said groove for lubricating the faces of said flanges, and for sealing the crevice therebetween.

10. A bearing comprising a body portion having an oil groove therein, and means for supporting a shaft, an internal flange formed within the end of the bearing, the projecting end of the bearing beyond the flange being circular in cross-section and being provided with an oil groove, a collar on the shaft adapted to fit within the projecting end of the bearing and engage said flange, said groove being adapted to receive a grease for lubricating the abutting faces between the collar and flange and for sealing the crevice therebetween.

11. A bearing comprising upper and lower parts, the upper part having bearing surfaces for direct engagement with a shaft, a plurality of spaced parallel ribs spanning the lower part and having a continuous uninterrupted oil-well beneath said ribs extending from end to end of the bearing, and a movable liner supported on said ribs for engagement with a shaft.

12. A bearing comprising an upper part having bearing surfaces for direct contact with a shaft, a lower part provided with parallel spaced-apart ribs, and a continuous liner supported on said ribs extending from end to end of the bearing to provide for a relatively large bearing surface for the shaft.

In testimony whereof I have hereunto set my hand in presence of two subscribing witnesses.

JOSEPH L. HILLER.

Witnesses:
FLORENCE L. HILLER,
J. F. CULLIN.

Copies of this patent may be obtained for five cents each, by addressing the "Commissioner of Patents, Washington, D. C."